United States Patent
Solmaz et al.

(10) Patent No.: US 12,530,478 B2
(45) Date of Patent: Jan. 20, 2026

(54) AUTOMATED DATA SHARING AND ANALYTICS USING A PRIVACY-PRESERVING DATA SPACE PLATFORM

(71) Applicant: NEC Laboratories Europe GmbH, Heidelberg (DE)

(72) Inventors: Gurkan Solmaz, Heidelberg (DE); Tobias Jacobs, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 233 days.

(21) Appl. No.: 18/326,050

(22) Filed: May 31, 2023

(65) Prior Publication Data

US 2024/0330497 A1    Oct. 3, 2024

Related U.S. Application Data

(60) Provisional application No. 63/455,288, filed on Mar. 29, 2023.

(51) Int. Cl.
*G06F 21/62* (2013.01)
*G06N 5/022* (2023.01)
(Continued)

(52) U.S. Cl.
CPC ......... *G06F 21/6218* (2013.01); *G06N 5/022* (2013.01); *G06N 20/00* (2019.01); *G06Q 40/04* (2013.01)

(58) Field of Classification Search
CPC .... G06F 21/6218; G06N 20/00; G06N 5/022; G06Q 40/04
See application file for complete search history.

(56) References Cited

U.S. PATENT DOCUMENTS

| 10,943,172 B1 * | 3/2021 | Tappin | G06N 5/022 |
| 2002/0056004 A1 * | 5/2002 | Smith | G06Q 40/04 |
| | | | 709/227 |

(Continued)

FOREIGN PATENT DOCUMENTS

| WO | WO 2015/001538 A2 | 1/2015 |
| WO | WO 2022/162421 A1 | 8/2022 |

OTHER PUBLICATIONS

Cirillo, Flavio et al.; "A Standard-based Open Source IoT Platform: Fiware"; *IEEE Internet of Things Magazine*; May 6, 2020; pp. 12-18; vol. 2, No. 3; ArXiv.org; Cornell University; Ithaca, NY, USA.

(Continued)

*Primary Examiner* — Oleg Survillo
(74) *Attorney, Agent, or Firm* — Leydig, Voit & Mayer, Ltd.

(57) ABSTRACT

A computer-implemented method for performing automated sharing of data and analytics across a data space platform includes receiving a request for a data analytics service from a first data stakeholder, determining first semantic data for the service based on the first data stakeholder and the request, and extracting second semantic data from a second data stakeholder based on comparing relevance to the first semantic data. The first semantic data comprises raw data and semantic annotations, stored as a knowledge graph. An analytics insight based on the first and second semantic data is provided to the first data stakeholder without revealing the second semantic data. The method can be applied to machine learning and regression problems (continuous values) including, but not limited to, providing improvements to various technical fields such as medical diagnosis and treatment, operation system design and optimization, mate- (Continued)

rial design and optimization, telecommunication network design, decision making and optimization.

20 Claims, 7 Drawing Sheets

(51) Int. Cl.
*G06N 20/00* (2019.01)
*G06Q 40/04* (2012.01)

(56) References Cited

U.S. PATENT DOCUMENTS

| | | | |
|---|---|---|---|
| 2009/0132395 A1* | 5/2009 | Lam | G06F 16/9535 705/30 |
| 2011/0288877 A1* | 11/2011 | Ofek | G16H 50/20 707/661 |
| 2015/0286709 A1* | 10/2015 | Sathish | G06Q 10/06 706/45 |
| 2015/0290808 A1 | 10/2015 | Renkis | |
| 2017/0357249 A1 | 12/2017 | Sandler et al. | |
| 2017/0372608 A1* | 12/2017 | Sugimoto | G08G 1/0145 |
| 2018/0007206 A1 | 1/2018 | Klein et al. | |
| 2018/0165604 A1 | 6/2018 | Minkin et al. | |
| 2018/0246944 A1 | 8/2018 | Yelisetti et al. | |
| 2020/0133970 A1 | 4/2020 | Khabiri et al. | |
| 2021/0042767 A1 | 2/2021 | Guan et al. | |
| 2022/0084510 A1* | 3/2022 | Peng | G10L 15/063 |
| 2022/0309037 A1* | 9/2022 | Gutierrez | G06F 16/16 |
| 2022/0374402 A1* | 11/2022 | Hawkins | G06F 16/215 |
| 2023/0325735 A1* | 10/2023 | Torstensen | G06Q 10/101 705/7.17 |
| 2023/0351209 A1* | 11/2023 | Markov | G06F 16/288 |
| 2024/0006060 A1* | 1/2024 | Behlmann | G16H 50/20 |
| 2024/0202212 A1* | 6/2024 | Vidal | G06F 16/2455 |

OTHER PUBLICATIONS

Halevy, Alon Y. et al.; "Dataspaces: A New Abstraction for Information Management"; *2006 International Conference on Database Systems for Advanced Applications*; Apr. 12, 2006; pp. 1-2 (Abstract); Springer; Berlin, Germany.

Krafft, Manfred et al.; "Insight is power: Understanding the terms of the consumer-firm data exchange"; *Journal of Retailing*; Nov. 28, 2020; pp. 133-149; vol. 97, No. 1; Elsevier; Amsterdam, The Netherlands.

Lomotey, Richard K. et al.; "Data Trusts as a Service: Providing a platform for multi-party data sharing"; *International Journal of Information Management Data Insights*; Apr. 24, 2022; pp. 1-20; vol. 2, No. 1; Elsevier; Amsterdam, The Netherlands.

Privat, Gilles; "Guidelines for Modelling with NGSI-LD"; *ETSI White Paper No. 42*; Mar. 1, 2021; pp. 1-55; vol. 1; ETSI; Valbonne—Sophia Antipolis, France.

Quix, Christoph et al.; "Business Process Modelling for a Data Exchange Platform"; *29th International Conference on Advanced Information Systems Engineering (CAISE 2017)*; Jun. 12, 2017; pp. 153-160; vol. 1848; CEUR Workshop; Essen, Germany.

Randles, Bernadette M. et al.; "Using the Jupyter Notebook as a Tool for Open Science: An Empirical Study"; *2017 ACM/IEEE Joint Conference on Digital Libraries*; Jun. 19, 2017; pp. 338-339; ACM Publications; New York, NY, USA.

Ratner, Alexander et al.; "Data Programming: Creating Large Training Sets, Quickly"; *30th Conference on Neural Information Processing Systems*; May 25, 2016; pp. 3567-3575; vol. 1; ArXiv. org; Cornell University; Ithaca, NY, USA.

Saunshi, Nikunj et al.; "Understanding Contrastive Learning Requires Incorporating Inductive Biases"; *Proceedings of the 39th International Conference on Machine Learning*; Feb. 28, 2022; pp. 19250-19286; vol. 162; ArXiv.org; Cornell University; Ithaca, NY, USA.

Ying, Rex et al; "Neural Subgraph Matching"; *2021 International Conference on Learning Representations*; Oct. 27, 2020; pp. 1-16; vol. 2; ArXiv.org; Cornell University; Ithaca, NY, USA.

* cited by examiner

AUTOMATED DATA SHARING AND ANALYTICS USING A PRIVACY-PRESERVING DATA SPACE PLATFORM

CROSS-REFERENCE TO PRIOR APPLICATION

Priority is claimed to U.S. Patent Application No. 63/455,288, filed on Mar. 29, 2023, the entire disclosure of which is hereby incorporated by reference herein.

FIELD

The present invention relates to data analytics, artificial intelligence (AI) and machine learning, and in particular, to a method, system and computer-readable medium for enabling collaboration in a shared data space for hosting data and consuming automated data analytics services.

BACKGROUND

Sharing and exchanging data among domains or entities can help provide improved application services. However, stakeholders are reluctant to share or exchange data due to concerns such as exposing valuable trade secrets or private information. This is considered a major obstacle to making the data economy a reality.

SUMMARY

In an embodiment, the present invention provides a computer-implemented method for performing automated sharing of data and analytics across a data space platform. The method includes receiving a request for a data analytics service from a first data stakeholder of a plurality of data stakeholders and providing an initial analysis to the first data stakeholder based on determining a portion of semantic data of the data space platform that is accessible to the first data stakeholder. The initial analysis is updated based on comparing the portion of semantic data accessible to the first data stakeholder with another portion of semantic data of the data space platform that is accessible to a second data stakeholder. The updated analysis is provided to the first data stakeholder. The method can be applied to machine learning and regression problems (continuous values) including, but not limited to, providing improvements to various technical fields such as medical diagnosis and treatment, operation system design and optimization, material design and optimization, telecommunication network design and optimization.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
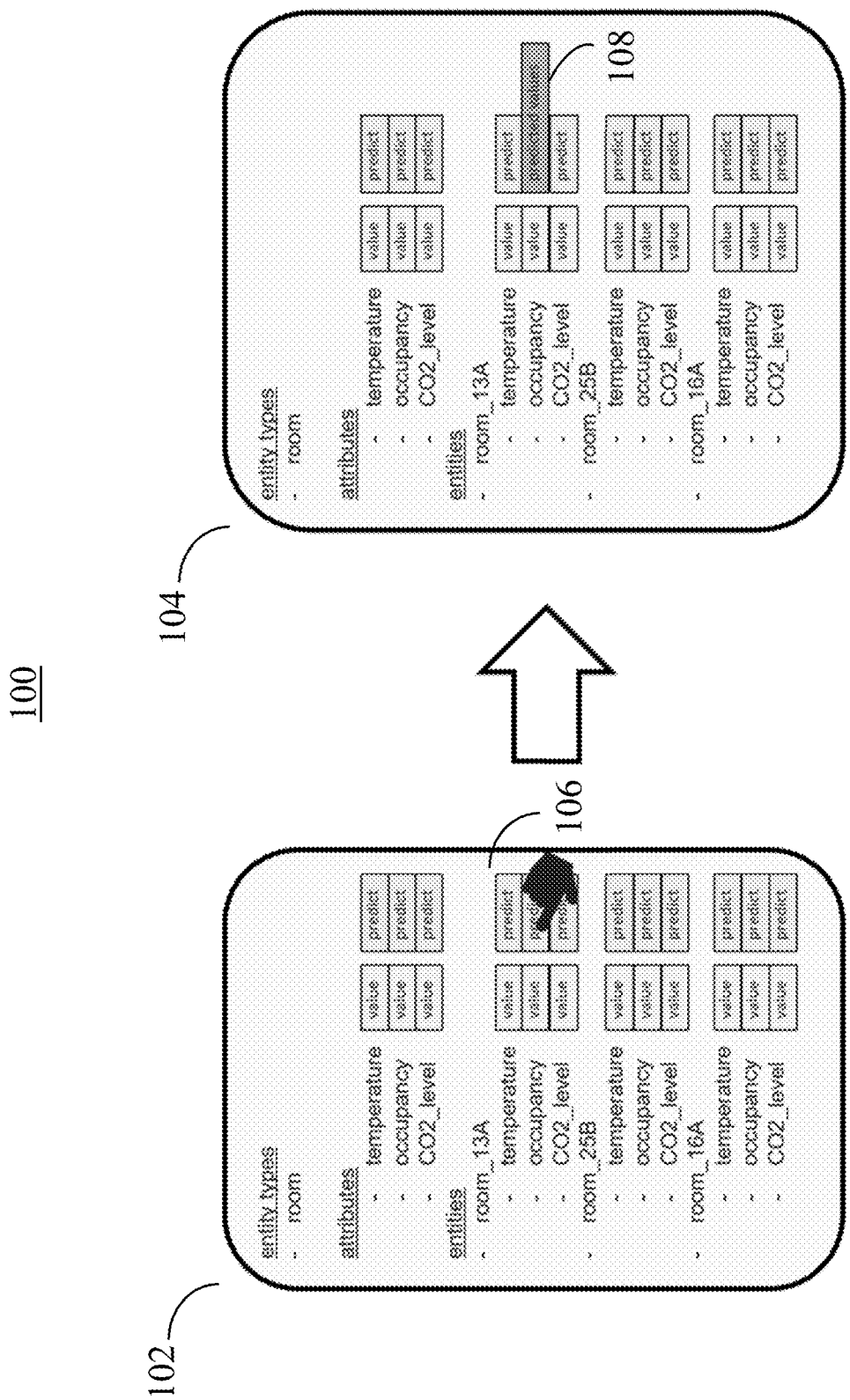
FIG. 1 schematically illustrates application of an analytics service on a data set of a stakeholder in response to a query, according to an embodiment of the present invention.

Embodiments of the present invention provide a system that enables stakeholders from different regions and domains to collaborate in a shared data space for hosting data and utilizing/consuming automated data analytics services. The system builds on a semantic knowledge graph, where every stakeholders' knowledge is semantically annotated and it leverages semantic graph for automated and enhanced data analytics across the data space. The system, in addition to providing easy access to automated data analytics services, also saves computational and memory resources, and/or frees up computational resources and memory for other tasks. Moreover, embodiments of the present disclosure can also be applied to effect improvements in the technical field of patient health monitoring between various facilities, by using semantic analysis on the data shared by different hospitals in a dataspace. This allowing for fast and secure access of patient data information across a variety of facilities. Additionally, embodiments of the present disclosure may also be applied to improve traffic management and mobility by accessing information from a plurality of sources and analyzing patterns to accurately predict traffic patterns. Embodiments of the present invention may also be used to improve building energy management, by creating a data space where data of multiple buildings is brought together and semantically analyzed using a semantic knowledge graph to predict occupancy, occupant behavior, and energy usage based on historical data.

Embodiments of the present invention overcome the technical challenges presented by trying to provide for automated analytics shared across many stakeholders for analytics solutions. In particular, embodiments of the present invention overcome the technical problem of how to enable automated improvements in analytics without giving full access to the proprietary data sources, thereby providing an improved data analytics method and platform having improved computer functionality that is more secure and includes privacy-preserving technology. The feature of the present invention that allows for secure sharing of data between the various computing systems improves the technical ability of the computing systems to keep data secure while simultaneously utilizing it for analytics solutions.

According to existing technology, most conventional vertical solutions that provide data analytics services are "siloed". For any given vertical domain problem that is even well-defined (e.g., prediction of occupancy of a particular building), a task force consisting of engineers, building managers, researchers, data scientists, first plan a data collection campaign through deployment of sensors in the building, connecting them into system and providing ground-truth information. Later, the data is utilized for further configuration and training for machine learning-based predictions.

There exist solutions such as the FIWARE IoT Platform (see Cirillo, Flavio, Gürkan Solmaz, Everton Luís Berz, Martin Bauer, Bin Cheng, and Ernoe Kovacs, "A standard-based open source IoT platform: FIWARE," IEEE Internet of Things Magazine 2, no. 3: 12-18 (2019), which is hereby incorporated by reference herein) and Amazon Data Exchange Platform (see Krafft, Manfred, et al., "Insight is power: Understanding the terms of the consumer-firm data exchange," Journal of Retailing 97.1 (2021): 133-149, which is hereby incorporated by reference herein), which enable data sharing or exchanges. These platforms do not consider automating the data analytics based on the availabilities of data and services of data providers/consumers.

Open-source systems such as Jupyter Notebooks (see Randles, Bernadette M., et al., "Using the Jupyter notebook as a tool for open science: An empirical study," 2017 ACM/IEEE Joint Conference on Digital Libraries (JCDL), IEEE (2017), which is hereby incorporated by reference herein) can be connected to the IoT platform to enable developers (e.g., data scientists) to analyze data and make predictions. However, this platform requires the analytics developers to use coding for data analytics as opposed to offering automated services. For instance, which data features will be used and the data discovery is left to the data consumers who are also data analyzers.

Embodiments of the present invention address the technical problem of how to provide for automated collaborative data analytics and provide a privacy-preserving data space platform that solves this problem. The platform helps to realize the data space principles (https://h2020-demeter.eu/wp-content/uploads/2021/05/Position-paper-design-principles-for-data-spaces.pdf) of data sovereignty, data level playing field, and decentralized infrastructure. It further provides technology to enable the future data economy. A data economy is a global digital ecosystem in which data is gathered, organized, and exchanged by a network of vendors for the purpose of deriving value from the accumulated information.

In an embodiment, the present invention provides a system comprising a data space platform that enables an "automated data analytics marketplace" based on semantic data. In this context, the semantic data consists of raw data and semantic annotations, which can be represented as a graph or any other applicable format. The raw data that is tagged with semantic annotations may then be exchanged between various vendors in the automated data analytics marketplace as needed by the vendors.

In accordance with embodiments of the present invention, vendors are the stakeholders that use the data space platform. The vendors collaborate through the platform for improved application services. The terms vendor and stakeholder are used interchangeably. Embodiments of the present invention apply to any multi-party collaboration (for example, not just from one stakeholder A to another stakeholder B, but, for instance, also from stakeholder A and/or B to stakeholder C or from stakeholder A to stakeholders B, C and/or D, etc.).

In accordance with embodiments of the present invention, the system users can be served automatically where they can enter manual or automated queries for their needed analytics tasks. The stakeholders can be both providers and/or consumers of data.

In accordance with embodiments of the present invention, the system creates semantic annotations and performs semantic data utilization using the following steps, for any desired data analytics service by a stakeholder (e.g., a desired predicted/simulation result with a well-defined classification or regression problem):

1. The data space platform semantically annotates the data from all stakeholders using the semantic knowledge bases as follows.
2. The data space platform stores a number of "semantic analytics templates" where each template is characterized by one or a combination of the following: output, historical inputs required for training, live inputs required for executing, model quality, terms of usage/access, and/or other characteristics.
3. When a stakeholder A requests an analytics insights from the system, the data space platform determines the currently accessible portion of semantic data for stakeholder A and utilizes semantic data for the requested data analytics service, and provides initial analytics service.
4. When a stakeholder A asks for an analytics service, the data space platform looks for suitable templates. The highest quality template is chosen for which all necessary data is accessible to stakeholder A.
5. The data space platform also looks for higher quality templates. The data space platform checks whether models could be provided with data accessible to/owned by other stakeholders (e.g., stakeholder B).
6. If the previous step 5 is successful, data space platform tries to organize the data sharing according to the data usage policies of the stakeholder B. The data space platform serves the offer from stakeholder B to stakeholder A and sets up semantic data exchange between the stakeholder A and stakeholder B. A negotiation mechanism can be included in this step.
7. If the previous step 6 is successful, the data space platform trains and deploys the higher quality model.
8. The data space platform provides output analytics insights to stakeholder A. The insights are a result of utilizing the enhanced semantic data and improved analytics.

Overall, different types of metadata could be used, including semantic annotation and descriptions, geo-coordinates, data from existing 3D models of environments, historical information, relevant data sources, and raw information.

In addition to the semantic analytics templates, embodiments of the present invention provide "value exchange templates" which define the terms, conditions, and policies of data usage. A value exchange template could include the following: duration of usage, privacy constraints, anonymization requirements, security requirements, region requirements (e.g., allowed only within a certain country), cost of usage of data by the data space platform (e.g., price of the data usage), cost of making shared (raw) data accessible to other stakeholders, cost of partial access (e.g., access to a subset of data, lower granularity), and/or other terms, conditions, and policies. For example, a template could specify that pseudonymized data (→anonymization requirement) can be used within Europe (→region requirement) for a price (→cost of usage).

In accordance with another embodiment of the present invention, in addition to the value exchange templates, each stakeholder can have a resource (e.g., budget) and specifications for offers. Having such specifications would enable the data space platform to automatically make the agreement protocol based on the terms, conditions and policies of stakeholder B, and terms and resources available for stakeholder A.

In accordance with an embodiment of the present invention, the data space platform provides the offer by visualizing semantic analytics templates and value exchange templates as offers to the consumer stakeholder (stakeholder A).

According to a first aspect, the present disclosure provides a computer-implemented method for performing automated sharing of data and analytics across a data space platform. The method includes receiving a request for a data analytics service from a first data stakeholder of a plurality of data stakeholders and providing an initial analysis to the first data stakeholder based on determining a portion of semantic data of the data space platform that is accessible to the first data stakeholder. The initial analysis is updated based on comparing the portion of semantic data accessible to the first data stakeholder with another portion of semantic data of the data space platform that is accessible to a second data stakeholder. The updated analysis is provided to the first data stakeholder.

According to a second aspect, the method according to the first aspect further comprises receiving a first set of raw data at the data space platform from the first data stakeholder, and mapping the first set of raw data to a first semantic analytics template of a semantic knowledge base to generate semantic data, and wherein the semantic data is stored in the form of a knowledge graph.

According to a third aspect, the method according to the first or second aspect further comprises receiving a second set of raw data at the data space platform from the second data stakeholder, mapping the second set of raw data to a second semantic analytics template of the semantic knowledge base to generate a second set of semantic data and fusing the second set of semantic data with the semantic data to generate an updated knowledge graph.

According to a fourth aspect, the method according to any of the first to third aspects further comprises updating the initial analysis by determining that semantic data associated with the first data stakeholder in the knowledge graph is not sufficient for training a machine learning model, determining that the second set of semantic data of the knowledge graph is sufficient for training the machine learning model, and providing an offer to the first data stakeholder to train the machine learning model using a combination of the first set of raw data, the second set of raw data, and the second set of semantic data.

According to a fifth aspect, the method according to any of the first to fourth aspects further comprises receiving an acceptance of the first data stakeholder in response to the offer, training the machine learning model using the combination of the first set of raw data, the second set of raw data, and the second set of semantic data, and providing the trained machine learning model to the first data stakeholder.

According to a sixth aspect, the method according to any of the first to fifth aspects determines the semantic data associated with the first data stakeholder in the knowledge graph is not sufficient for training a machine learning model by performing a training of a first machine learning model with semantic data associated with the first data stakeholder, and determining a first uncertainty associated with the first machine learning model.

According to a seventh aspect, the method according to the first to sixth aspects determines the second set of semantic data of the knowledge graph is sufficient for training the machine learning model by performing a training of a second machine learning model with the second set of semantic data associated with the second data stakeholder, and determining a second uncertainty associated with the second trained machine learning model.

According to an eighth aspect, the method according to the first to seventh aspects further comprises that determining that the second set of semantic data of the knowledge graph is sufficient for training the machine learning model is based on whether the first uncertainty is greater than the second uncertainty.

According to a ninth aspect, the method according to any of the first to the eighth aspects further comprises that the request for data analytics includes a prediction request to fill a gap in the first set of raw data.

According to a tenth aspect, the method according to any of the first to the ninth aspects further comprises that updating the initial analysis comprises receiving a set of data policies associated with the second data stakeholder; and determining based on the set of data policies associated with the second data stakeholder whether the first data stakeholder has access to data from the second data stakeholder.

According to an eleventh aspect, the method according to any of the first to the tenth aspects further comprises that the first data stakeholder and the second data stakeholder are hospitals, and wherein the request for the data analytics comprises a request for a prediction of patient health of a patient, or the first data stakeholder and the second data stakeholder are buildings, and wherein the request for the data analytics comprises a request for a prediction of occupancy data.

According to a twelfth aspect, the method according to any of the first to the eleventh aspects further comprises that the request for the data analytics comprises a request for a prediction of traffic condition.

According to a thirteenth aspect, the method according to any of the first to the twelfth aspects further comprises that updating the initial analysis further comprises comparing the portion of semantic data accessible to the first stakeholder with a third portion of semantic data of the data space platform that is accessible to a third stakeholder.

A fourteenth aspect of the present disclosure provides a computer system programmed for performing automated sharing of data and analytics across a data space platform, the computer system comprising one or more hardware processors which, alone or in combination, are configured to provide for execution of the method according to any of the first to thirteenth aspects.

A fifteenth aspect of the present disclosure provides a tangible, non-transitory computer-readable medium for performing automated sharing of data and analytics across a data space platform having instructions thereon, which, upon being executed by one or more processors, provides for execution of the method according to any of the first to thirteenth aspects.

FIG. 1 schematically illustrates application of an analytics service on a dataset of a stakeholder in response to a query, according to an embodiment of the present invention. FIG. 1 depicts a dataset 102. For exemplary purposes, the dataset 102 of FIG. 1 depicts data related to different rooms. The dataset 102 has defined the relevant data fields for the entity "room." As shown in FIG. 1, the entity "room" has data fields "temperature data," "occupancy data," and "$CO2\_level$" associated with it. Therefore, data associated with every room that is stored in dataset 102 has data associated with these three data fields. As shown in FIG. 1, there is data associated with "room_13A," "room_25B," and "room_16A" stored in dataset 102. Data for each room has a corresponding temperature value, an occupancy value and a value of the CO2_level associated with each room. Using this information, a user utilizing dataset 102 may wish to predict the value of data associated with any one of the data fields of any one of the rooms at a later time. For example, as shown in FIG. 1, a user, by way of a cursor 106 wishes to generate a predicted value for the occupancy data field of room_13A. Using the data analytics described in embodiments of this invention, a predicted value 108 is generated in updated dataset 104.

Figure 2:
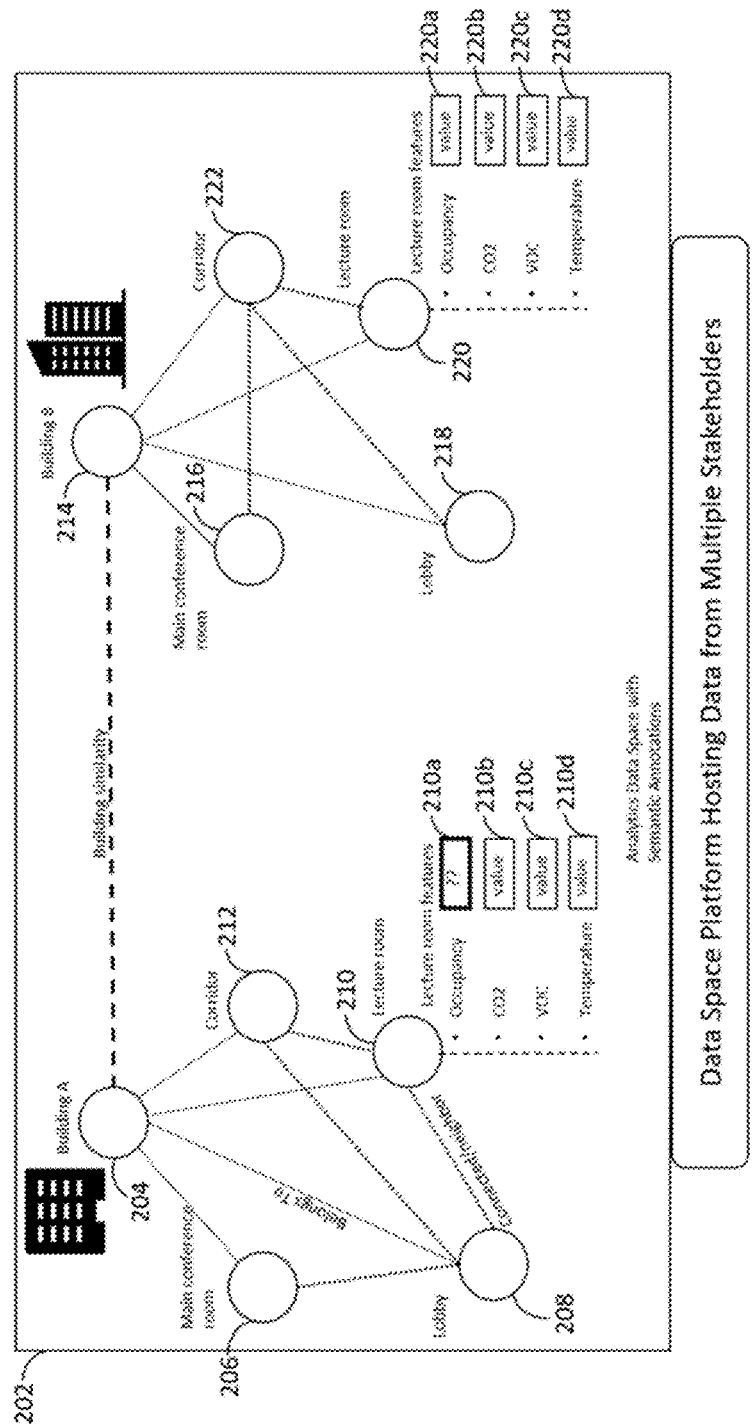
FIG. 2 schematically illustrates a data space platform that matches data from different stakeholders into a semantic knowledge graph, according to an embodiment of the present invention.

In accordance with an embodiment, the present invention considers multiple stakeholders that are connected to the data space platform. These stakeholders can be also considered as "hosted by" the system 202 as illustrated in FIG. 2.

For exemplary purposes, system 202 depicts two different buildings are depicted stakeholders shown that are hosted by the data space platform. The two buildings 204 and 214 are connected by tags provided by the data space platform based on the data associated with each building. In some embodiments, the data space platform may calculate a similarity coefficient between different kinds of data hosted by the data space platform. As shown in FIG. 2, a building similarity coefficient may be calculated by the data space platform based on the data that is stored associated with each building. For example, as shown in FIG. 2, both building A 204 and building B 214 have data associated with a main conference room (206 in building A and 216 in building B), a lobby (208 in building A and 218 in building B), a lecture room (210 in building A and 220 in building B), and a corridor (212 in building A and 222 in building B). Each of the rooms indicated in FIG. 2 have multiple data fields associated with it. For exemplary purposes, the data fields associated only with one room, the Lecture room (210 in building A and 220 in building B) are shown. The data fields associated with lecture room 210 in building A include an occupancy value 210*a*, a CO2 value 210*b*, a volatile organic compounds (VOC) value 210*c*, and a temperature value 210*d*. Similar data fields (occupancy value 220*a*, CO2 value 220*b*, VOC value 220*c*, and temperature value 220*d*) are also associated with lecture room 220 of building B. The data from both building A 204 and building B 214 is provided to the data space platform. By semantically analyzing the data and the data fields associated with building A 204 and building B 214, the data space platform may determine that building A 204 is similar to building B 214 and may semantically tag the data associated with the building A 204 and building B 214 to be similar.

In some embodiments, semantic analysis of data includes analyzing mapping the raw data associated to semantic concepts. The semantic concepts are usually programmed in a semantic mapper associated with the data space platform. In some embodiments, the semantic concepts include performing pattern recognition on the raw data and also analyzing the data fields that contain the raw data. Based on the semantic analysis performed, each dataset in the data space platform may be assigned certain semantic tags that map the stored data to certain semantic concepts. All data that is mapped to the same semantic concepts may be considered similar. In some embodiments, the semantic data may be connected to each other using queries in a graph database also in the data space platform. For example, because the data fields of building A 204 and building B 214 are similar, the data stored related to building A 204 and data stored related to building B will may be mapped to the same semantic concept. However, if data associated with building A 204 and data associated with building B 214 did not have data fields that were common between the two sets of data, they data associated with the two buildings may be mapped to different semantic concepts. Using the semantic tags generated for each set of data stored in the data space platform, the data space platform is able to match various datasets to each other as data is provided to the data space platform, for easy access and analytics as described below. Exemplary semantic tags refer to "ontology" or "schema" that are listed in a semantic ontology. In some examples, an ontology is a way of describing the properties of a subject area and how they are related, by defining a set of concepts and categories that represent the subject. For example, an ontology may include description of and links between various data fields related to various buildings that are part of the data space platform. An exemplary ontology of building A 204 may include data fields related to rooms such as a main conference room, a lobby, a lecture room, and a corridor in the building. The data fields related to these rooms may include occupancy data, temperature data, CO2 levels related to each room.

For example, a stakeholder may query the data space platform to receive a predicted or simulated result for missing data in a dataset (due to e.g., lack of sensor, cost of configuration, lack of remote access). For instance, as shown in FIG. 2, stakeholder a operating building A 204 is missing the "Occupancy" data 210*a* of their building whereas they have other data sources. On the other hand, another stakeholder B operating building B 214 has the occupancy data 220*a*, and the building B 214 is similar to the building A 204, which is annotated semantically by the data space platform.

In such a scenario, the data space platform first provides an initial prediction without any ground-truth training data, but instead uses a predefined set of rules for the training, from the existing data from building A 204. These set of rules can be based on the domain knowledge or external data sources. The data space platform identifies that the missing semantic data for the building A 204 exists for the building B 214, and offers the semantic data from stakeholder B to stakeholder A. The data space platform can understand which data is missing by leveraging the semantic data of building B 214. For instance, the data space platform can automatically train another machine learning model on the building B 214 data and compare the accuracy based on the ground-truth availability of building B 214.

If stakeholder A accepts the offer, they can be given the semantic data, the trained machine learning model (from building B 214) by the data space platform, or any other means that would compensate the missing data problem for improving the predictions for the occupancy of building A. In this embodiment, the semantic annotations of data, determination of building similarities between building A 204 and building B 214, matching and identification of relevant data sources from stakeholder B, and data analytics are provided by the data space platform.

As a technical advantage, through the newly proposed service, the stakeholder A would be able to access the occupancy information with higher accuracy and with a converged and robust prediction model. The system enables it through the automatic matching of raw building data to building semantic knowledge graphs, detecting similarity between building A and B and creating a unified semantic, and matching missing data with the existing data in the semantic graph.

Figure 3:
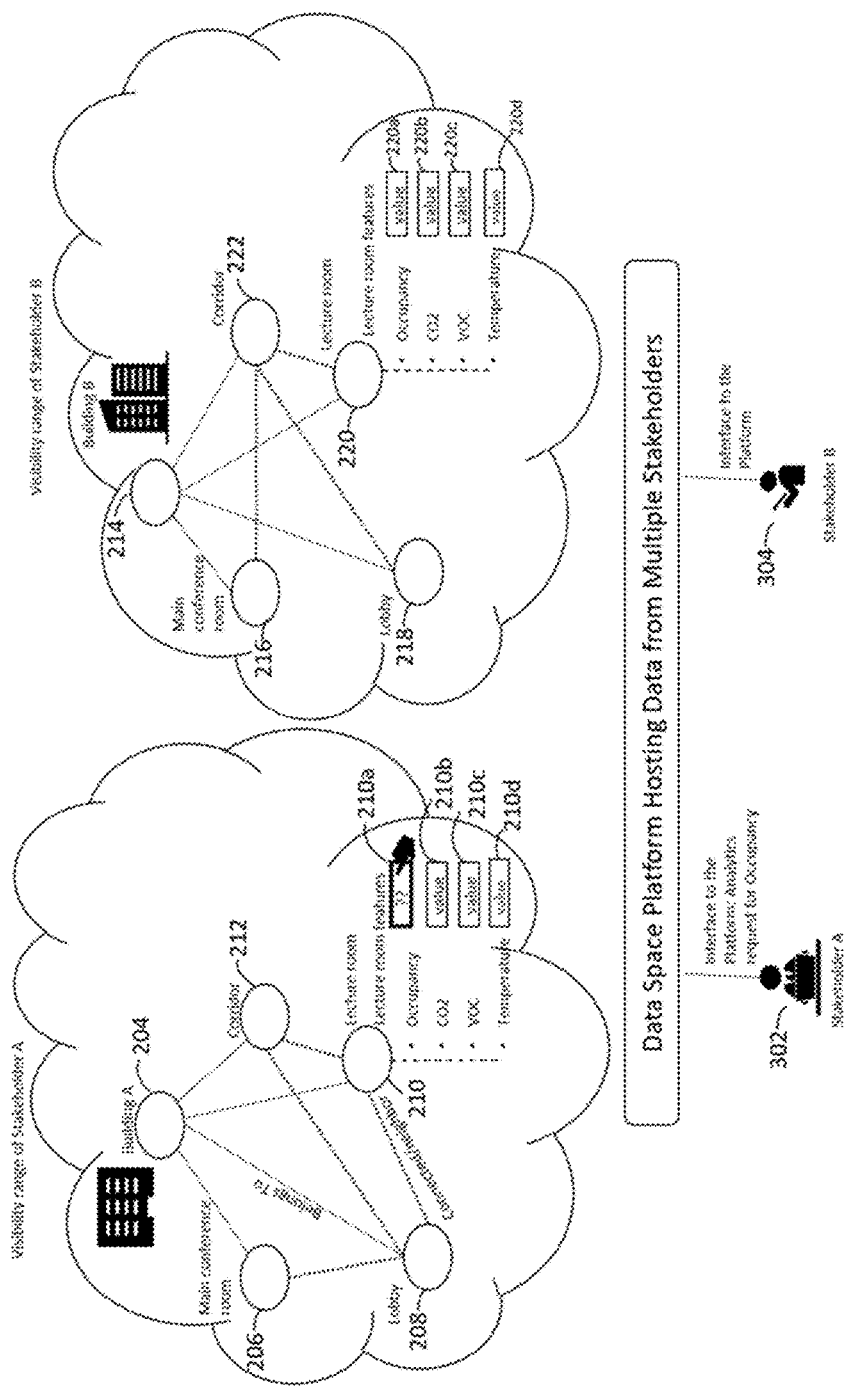
FIG. 3 schematically illustrates a data space platform with interface for data exchange and analytics queries, according to an embodiment of the present invention.

In some embodiments, the data of the first stakeholder A is separated from the data of the second stakeholder B so as to ensure security of the data. This embodiment separates the semantic data of stakeholder A and stakeholder B in the data space platform so that the stakeholders have limited access to the data space platform data as illustrated in FIG. 3. For instance, they can access only to the raw data that they previously provided and the semantic annotations for those data items by the data space platform. Stakeholders can interface to the platform and request an analytics service for a missing feature (e.g., occupancy of building A in FIG. 2). When stakeholder A sends a request for the analytics service, data space platform automatically access the data from stakeholder B, train a machine learning model, and shares with stakeholder A only the analytics results (e.g., occupancy predictions by a trained logistic regression model) but does not share the semantic data from stakeholder B. The actual data can be stored in a distributed fashion by the stakeholders, or it can be stored in the platform but with restricted access.

As shown in FIG. 3, the data of building A 204 that is associated with the first stakeholder 302, is kept separate from the data of building B 214 that is associated with stakeholder 304 in the data space platform. The data space platform receives the data from the independent stakeholders 302 and 304 and performs semantic analysis of the data of building A 204 and the data of the building B 214 separately. In some embodiments, if the stakeholder 302 requests for an analytics service from the data space platform to provide predicted or simulated result for missing data of occupancy 210a, the data space platform accesses the data associated with building B 214, trains a machine learning model based on the semantic data of building B 214, and provides only the trained machine learning model to the stakeholder A 302. The semantic data of building B 214 and other analytical data is not shared with stakeholder A 302.

This embodiment includes the flow of queries between the proposed systems (DSP), stakeholders (e.g., stakeholder A and stakeholder B), a semantic knowledge base, and a Graph Database.

Figure 4:
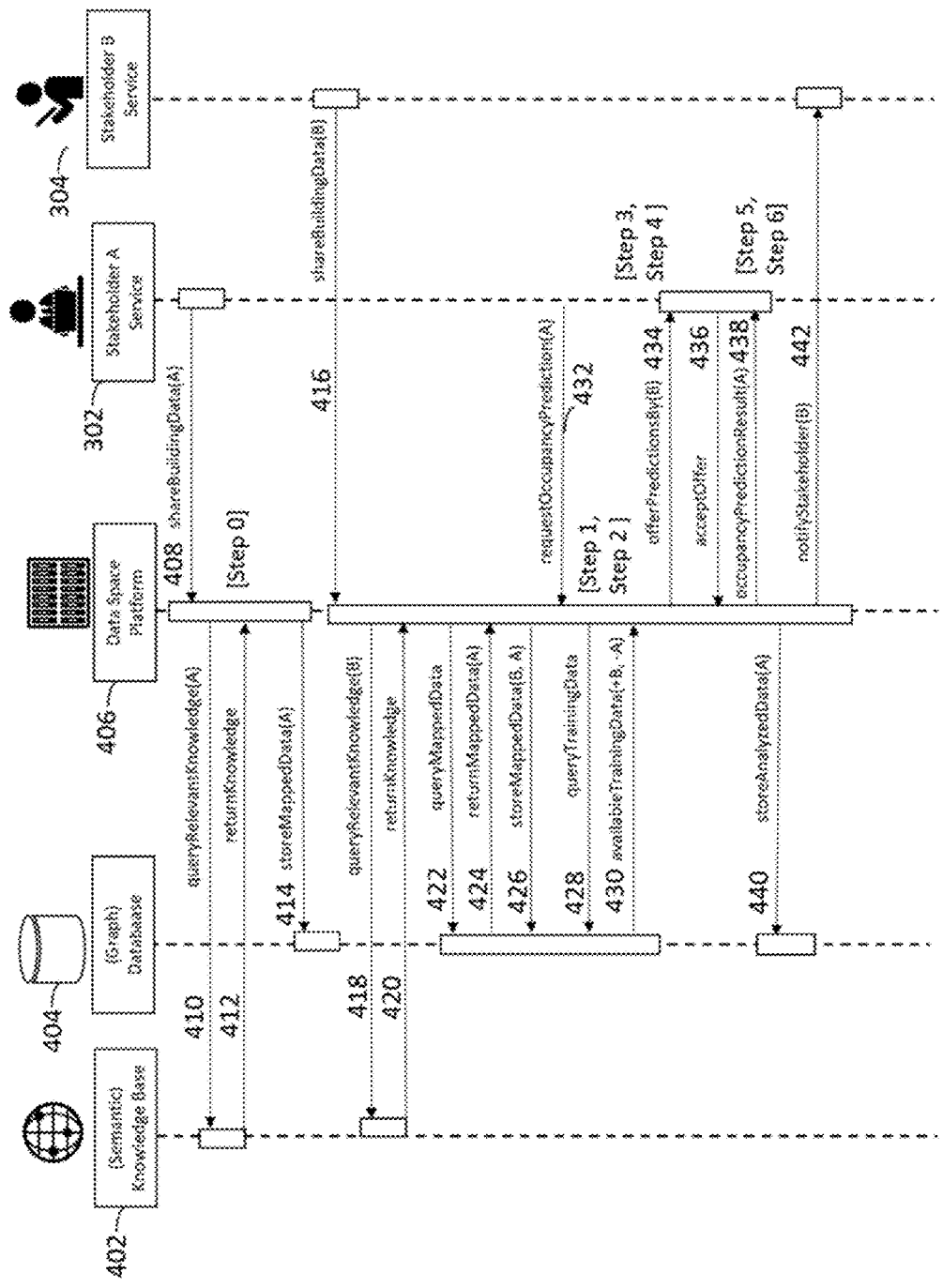
FIG. 4 illustrates a flow diagram for analysis of data hosted on the data space platform from multiple stakeholders and serving analytics results on-demand, according to an embodiment of the present invention.

FIG. 4 illustrates a flow diagram for analysis of data hosted on the data space platform from multiple stakeholders and serving analytics results on-demand, according to an embodiment of the present invention. The flow diagram of FIG. 4 includes a semantic knowledge base 402, a graph database 404, a data space platform 406 and stakeholders 302 and 304.

First, stakeholder A shares its raw data (e.g., building data) to the data space platform. The data space platform queries the semantic knowledge base and receives knowledge that might be relevant to the stakeholder A data. It makes the automated mapping of semantic knowledge to the raw data, thus creates the semantic data (mapped data) for stakeholder A. This data can be in a graph format based on the semantic links and data links, or it can be any other relevant format. Afterwards, the data space platform stores the data in a (graph) database, of the data space platform. For example, semantic links or data links can be used to define the edges of the graph, whereas the real-world entities (e.g., a specific building, room) with semantic tags can represent the nodes of the graph. The graph can be represented in a relevant data structure/format and stored in a graph database.

The flow diagram starts with 408 when the stakeholder A 302 shares raw data with the data space platform 406. At 410, the data space platform 406 queries the semantic knowledge database 402 using the received raw data from stake holder A 302. At 412, the data space platform 406 provides semantic knowledge relevant to the data space platform 406. The semantic knowledge provided to the data space platform 406 is used by the data space platform to create semantic data for stakeholder A 302 that maps the raw data provided by stakeholder A 302 to the semantic knowledge of the semantic knowledge database 402. The semantic data may be in the form of a graph that is provided by the data space platform 406, at 414, to the graph database 404 for storage. In some embodiments, the graph database 404 may be a part of the data space platform 406.

Second, stakeholder B shares its raw data to the data space platform. The data space platform queries the semantic knowledge base and receives knowledge that might be relevant to the stakeholder B data. Before making a semantic data mapping, this time the data space platform queries the existing data from the graph database, which returns the mapped data from stakeholder A. The data space platform fuses the stakeholder B and stakeholder A data together into a single semantic data (e.g., semantic graph as in FIG. 2). The data space platform stores the data in the graph database.

At 416, stakeholder B 304 shares raw data with the data space platform 406. At 418, the data space platform 406 queries the semantic knowledge database 402 using the received raw data from stakeholder B 304. At 420, the data space platform 406 provides semantic knowledge relevant to the data space platform 406. Before using the semantic knowledge to generate semantic data for stakeholder B 304, the data space platform queries the graph database 404 at 422. At 424, the graph database 404 returns the semantic data associated with stakeholder A 302 to the data space platform 406. At 426, the data space platform adds to the already existing semantic data, which may be in the form of a graph, semantic data associated with the stakeholder B 304 that was generated based on the raw data provided by stakeholder B 304 and the semantic knowledge received from the semantic database 402.

Third, stakeholder A requests a prediction for its missing values (e.g., occupancy). The data space platform queries its graph database for training a machine learning model. The data space platform analyzes and determines that stakeholder B has data whereas stakeholder A does not have satisfactory data for its machine learning training. For example, this determination can be done by training machine learning model using only data from stakeholder A and observing high uncertainties in the predicted values, whereas training another machine learning model using data from stakeholder A and stakeholder B and observing lower uncertainty in the predicted values.

At 432, stakeholder A 302 may request a prediction or simulation for data missing from the dataset associated with stakeholder A 302 from the data space platform 406. At 428, in response to the request, the data space platform 406 may query the graph database 404 for training a machine learning model to provide the prediction or simulation for the missing data for stakeholder A 302. At 430, the data space platform 406 analyzes and determines that stakeholder B 304 has sufficient data for training the machine learning model, whereas stakeholder A 302 does not have satisfactory data for training the machine learning model. In some embodiments, this determination can be done by training machine learning model using only data from stakeholder A 302 and observing high uncertainties in the predicted values. On the other hand, the data space platform 406 may train another machine learning model using data from stakeholder A 302 and stakeholder B 304 and observe lower uncertainty in the predicted values of this machine learning model.

Fourth, the data space platform offers stakeholder A with a prediction service that is valued based on the value of stakeholder B data and any other service costs. If stakeholder A accepts (as in FIG. 4), the data space platform trains a machine learning (or a simulation) model using data from both stakeholder A and stakeholder B, and sends occupancy prediction results to stakeholder A. In some embodiments, the machine learning training (or simulation) can be performed before sending the offer to stakeholder A, such that the offer can also include the expected prediction performance (e.g., if offer is accepted, there will be 90% estimated accuracy).

At 434, the machine learning model that is trained with data from the stakeholder B 304 may be offered to stakeholder A 302 to perform the simulation and/or prediction for missing data in data associated with stakeholder A 302. In some embodiments, the machine learning model offered by the data space platform may be accompanied by semantic data associated with stakeholder B 304 and any other service costs. At 436, stakeholder A 302 may accept the machine learning model proposed by the data space platform 406. In response to the acceptance provided by the stakeholder A 302, the data space platform 406 may provide the predicted or simulated value requested by stakeholder A 302 at 432. In some embodiments, the newly trained machine learning model may also provide more semantic data for the graph database 404.

Fifth, the data space platform stores the analyzed data which includes the newly created (by machine learning or simulation) semantic data. Finally, the data space platform notifies the stakeholder B about the collaboration with stakeholder A. In some embodiments, the notification phase may also include the transmission of value, e.g., cost of semantic data that is previously valued by stakeholder B or determined by the data space platform.

At 440, the data space platform 406 stores the analyzed data, including semantic data associated with the newly trained machine learning model, in the graph database 404. At 442, data space platform 406 notifies stakeholder B 304 about the collaboration with stakeholder A 302.

Figure 5:
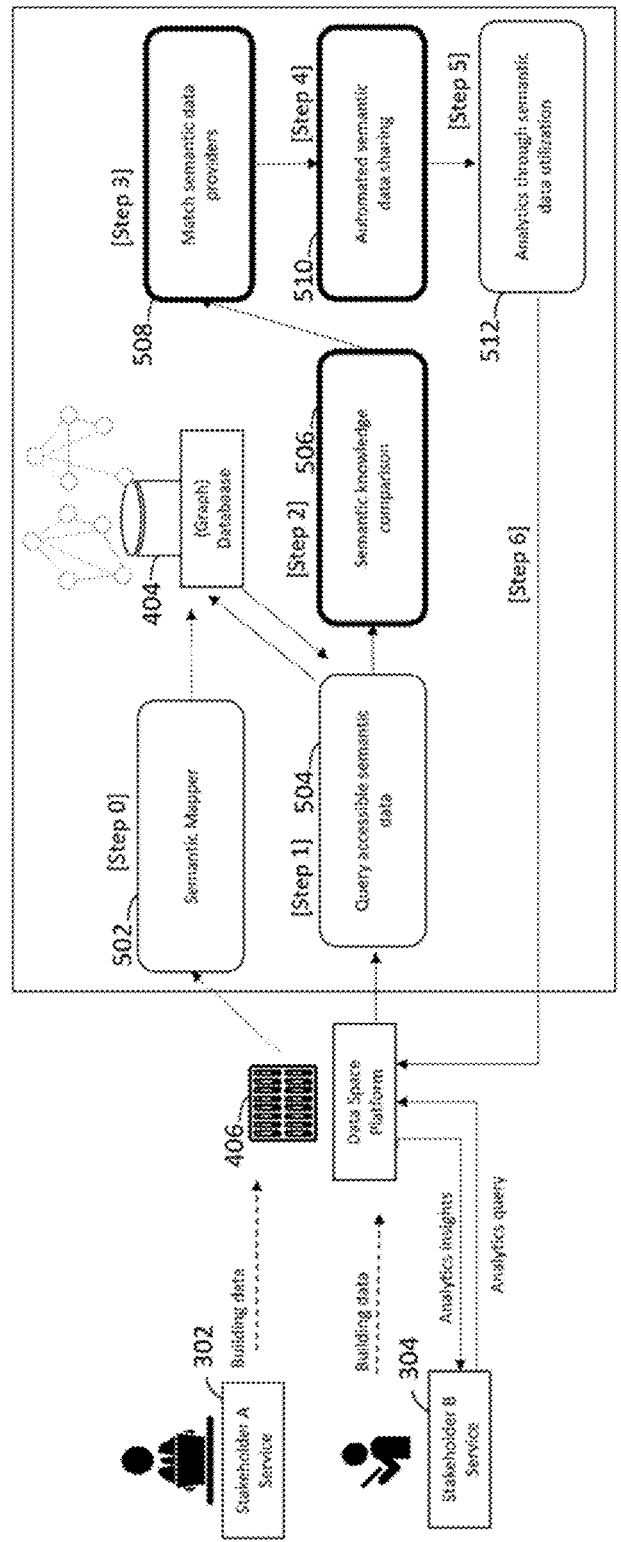
FIG. 5 schematically illustrates a data space platform with automated semantic mapping, semantic data comparison, semantic data sharing, and semantic data utilization, according to an embodiment of the present invention.
Figure 5:
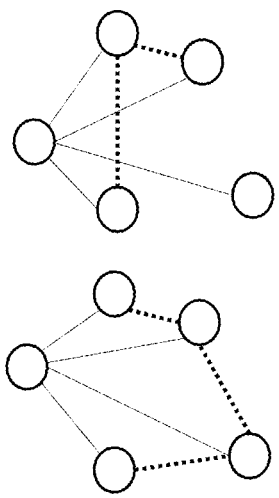

In accordance with an embodiment, the present invention includes an implementation of the data space platform through a set of system components. FIG. 5 shows the users of the data space platform (stakeholders) and the box includes the internal system components of the data space platform. In the system according to embodiments of the present invention, the matching of semantic data providers and automated semantic data sharing are newly proposed components. These components make use of the semantic analytics templates and value exchange templates for providing automated exchange and analytics.

As shown in FIG. 5, both stakeholders provide their raw data and one (or more) stakeholder(s) makes an analytics query to the data space platform. The building data goes through the following system components:
  A semantic mapper that maps the raw building data to the semantic concepts, automatically annotates the data with the concepts and creates the connected semantic data hosted by the data space platform.
  A (graph) database hosts and serves the semantic (linked) data through queries.

FIG. 5 depicts a data space platform 406 that is accessed by stakeholder A 302 and stakeholder B 304. The stakeholders 302 and 304 provide raw data to the data space platform 406. The data space platform analyses the raw data using the various components shown in FIG. 5 and provides analytical insights to the stakeholders 302 and 304 in response to various queries. The raw data provided to the data space platform 406 is provided to a semantic mapper 502 that is part of the data space platform 406. In some embodiments, the semantic mapper 502 is similar to the semantic knowledge base 402. The semantic mapper 502 receives the raw data from the data space platform 406 and maps the raw data to semantic concepts. Based on the mapping, the raw data is annotated with semantic concepts and creates the semantic data that is hosted by the data space platform. In some embodiments, the semantic data is generated in the form of a graph and the generated graph is stored in the graph database 404.

The following functions are triggered (activated) by an analytics query:
  Query accessible semantic data makes relevant queries to the graph database for accessing semantic data sources in the data space platform.
  Semantic knowledge comparison compares semantic data of stakeholder A and stakeholder B. As an example, the knowledge comparison can be performed based on the following steps:
  1. Queried entities/attributes in a semantic graph of stakeholder A 302 can be extracted along with their vicinity (for e.g., relevant concepts such as entities, attributes and relationships). The extraction of the queried entity would include the relevant concepts with their data.
  2. The queried entity/attribute is searched in the semantic data of stakeholder B 304. The search can be performed by text comparison or any other technique.
  3. If found relevant, the information with its vicinity can be extracted (e.g., as a subgraph) from the semantic data of stakeholder B 304.
  4. The queried entity and its vicinity from semantic data of stakeholder A 302 is compared with the relevant entity and vicinity extracted from the semantic data of stakeholder B 304. This comparison can be performed by subgraph matching techniques using text matching or graph matching (for e.g., graph comparisons in terms of node and edge characteristics) or any other method such as greedy comparison by traversing both of the data.
  Match semantic data providers creates a collaboration between stakeholder A and stakeholder B.
  Automated semantic data sharing enables exchanges of semantic data or a prediction model. This data sharing can happen in the data space platform (nonvisible to the stakeholders). In other embodiments, it can happen between the stakeholders.
  Analytics through semantic data utilization performs the analytics service (e.g., training a machine learning model or running a simulation model) and creates analytics outcomes.

Upon receiving an analytics query from a stakeholder (stakeholder B 304 as shown in FIG. 5), the data space platform 406 queries accessible semantic data from the graph database 404 via block 504. In some embodiments, the analytics query from a stakeholder B 304 may be a query to generate a simulation or prediction value for missing data from the data associated with stake holder B 304. In some embodiments, the graph database 404, in response to the query from the stakeholder B 304, only provides semantic data to which the stakeholder B 304 already has access. Using this semantic data the data space platform may train a first machine learning model to generate the predicted or simulated value. The data space platform may analyze the trained machine learning model generated and also determine that the predictions of the machine learning model have high uncertainty.

In order to improve the prediction for the stakeholder B 304, at 506, the data space platform 406 may compare semantic data of stakeholder B 304 with semantic data of stakeholder A 302. In some embodiments, stakeholder A 302 may have a more complete dataset that may be a better tool for training the machine learning model. In response to determining that the data associated with stakeholder A 302 is better for training the machine learning model, the data space platform 406 may, at 508, create a proposed collaboration between stake holder A 302 and stakeholder B 304. In some embodiments, the proposed collaboration may be based on the value exchange templates as defined for stakeholder A 302 and stakeholder B 304. For example, the value exchange template for stakeholder A 302 may have security requirements that may not allow the data space platform 406 to provide access to the semantic data of stakeholder A 302 to stakeholder B 304. In such cases, the proposed combination by the data space platform 406 will comply will the value exchange template for the value exchange template associated with stakeholder A 302.

If stakeholder A 302 accepts the proposed collaboration, the data space platform 406, at 510, may enable exchange of semantic data or prediction model between the two stakeholders 302 and 304. In some embodiments, the data sharing is based on the value exchange templates. In compliance with the value exchange templates, in some embodiments, the data sharing may happen in the data sharing platform but not be accessible to the stakeholders 302 and 304. In such embodiments, the stakeholder B 304 may only have access to the machine learning model that may be generated as a result of the data sharing between the stakeholder B 304 and the stakeholder A 302. In other embodiments, if the value exchange templates are more lenient and allow for data sharing between various stakeholders, the data space platform may share the semantic data of stakeholder A 302 along with the machine learning model with the stakeholder B 304.

At 512, the data space platform 406 performs the relevant analytics operation to provide stakeholder B 304 with the requested predicted or simulated data.

In a technical embodiment, the present invention is practically applied for semantic knowledge graph creation. In this embodiment, the data is modeled as "linked data", where the data can be mapped (linked) to its semantic knowledge by semantic annotations. Furthermore, the data can be modeled using entities (e.g., building, room), properties (e.g., occupancy, CO2), and relationships (e.g., connected rooms, neighbor rooms, similar buildings). Thus, a semantic knowledge graph including raw data (e.g., sensor data) and semantic annotations can be created using that data modeling.

Semantic annotations can be based on existing ontologies such as building ontologies or schemas. In other embodiments, the semantic annotations can link data to the knowledge sources (e.g., DBPedia).

Figure 6:
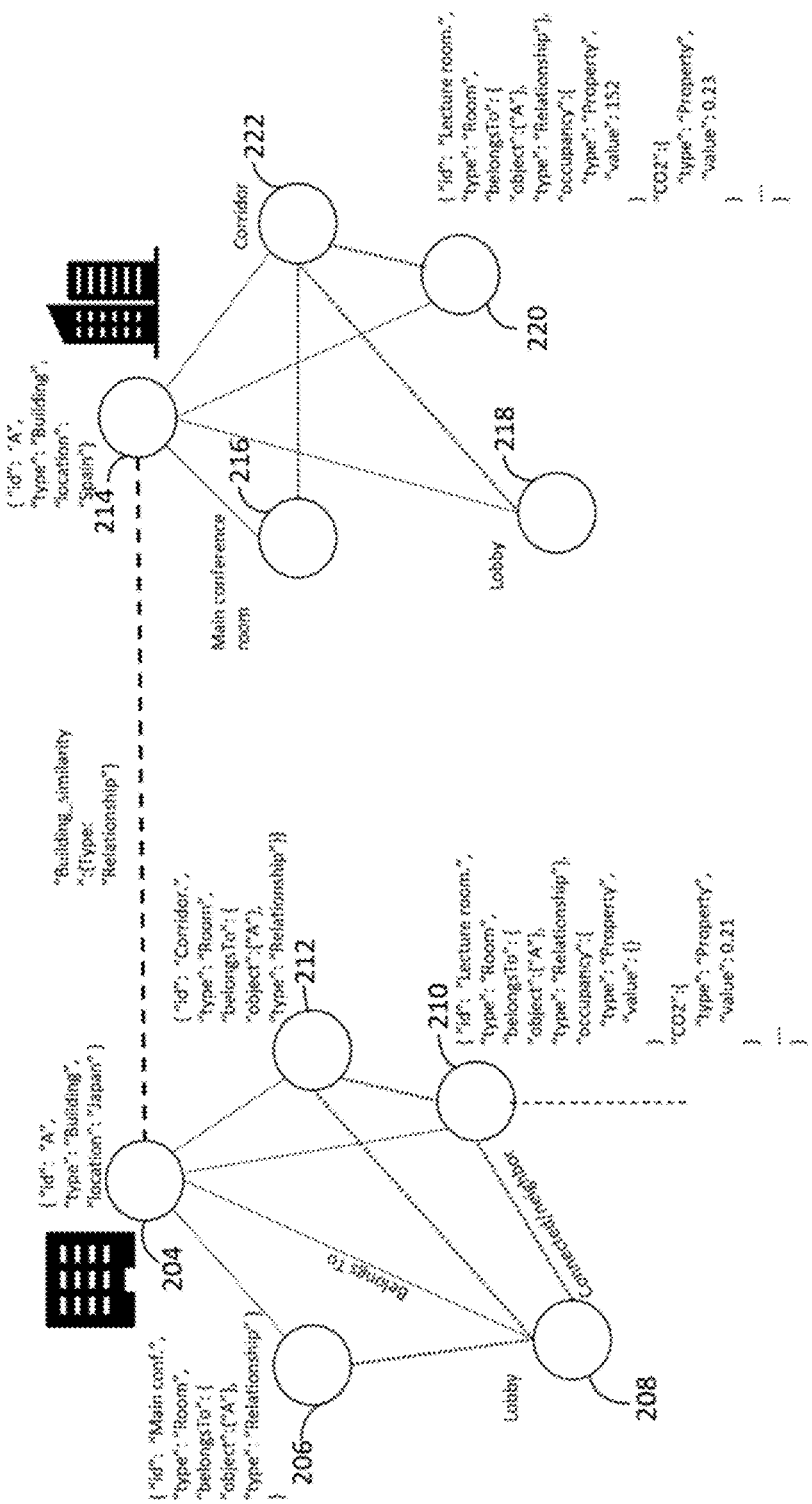
FIG. 6 schematically illustrates data modeling for semantic knowledge graph creation, according to an embodiment of the present invention.

FIG. 6 illustrates the data modeling for creating semantic knowledge based on data from the stakeholders, stakeholder A 302 and stakeholder B 304 for their respective buildings building A 204 and Building B 214. In the model, the "properties" can be used to model the data as a "semantic graph". For instance, in FIG. 6, the expected relationships in the semantic graph "building_similarity", "belongsTo", and "connected" can be modeled as "Property". Thus, a graph model can connect and represent all necessary information from both building A and building B.

For the sake of brevity, FIG. 6 only shows data fields associated with some of the elements of building A 204 and building B 214. The data associated with each element of building A 204 includes data fields such as "id." "type." These data fields further define the element within the data associated with building A 204. The data fields for each element also include data fields "belongs to:," and "type" that identify the data associated with the element to be associated with the larger element, which is building A 204 in this case. In some embodiments, the data associated with data fields "belongs to:" and "type" may be used to group the elements together.

In another technical embodiment, the present invention is practically applied for subgraph matching for entity similarity. This embodiment considers subgraph matching as a problem for understanding entities that belong to different stakeholders having similar characteristics. The embodiment needs solving the problem of the link between the stakeholders as shown in FIG. 6 as the "building_similarity". In the initial case when the stakeholders share their data to the data space platform, the relationship between these entities has not been established. For instance, building A and building B may have their data modeled and annotated as two separate semantic knowledge graphs. This embodiment considers automatically creating the relation between these entities based on "similarities".

The similarity can be simply based on the two entities having same types (e.g., both building A and building B having "type": "building"). In some embodiments, different similarity metrics can be defined to measure and create similarity between two entities, such as distance based on the geographical location of two entities or similarity based on the size or other features of the entities. In other embodiments, the internal characteristics of the entities can be utilized to create similarity metric between them. For instance, the design of two buildings (e.g., connections between rooms with certain types) can be compared for defining their similarity measure. In further embodiments, the data (content) from the two entities can be compared and similarities might be automatically observed and measured.

In further embodiments, various existing statistical and machine learning techniques such as subgraph matching (see Lou, Zhaoyu, et al. "Neural subgraph matching." arXiv preprint arXiv:2007.03092 (2020), which is hereby incorporated by reference herein) and contrastive learning (see Saunshi, Nikunj, et al., "Understanding contrastive learning requires incorporating inductive biases," arXiv preprint arXiv:2202.14037 (2022), which is hereby incorporated by reference herein) can be applied to understand matchings in a global semantic graph with many subgraphs, corresponding to many entities owned by various stakeholders.

In accordance with other technical embodiments, the present invention may be practically applied in the biomedical domain to analyze and share electronic records while maintaining privacy-compliance. For example, an embodiment of the present invention can be used for patient health monitoring between medical facilities, for statistical data (e.g., clustering, check-up exams) and for knowledge transfer.

In the case of need for diagnosis for a certain patient, a doctor in a medical facility can query the data space platform for a diagnosis guidance based on data analytics. The data space platform identifies missing data in the patient and explores data from similar patients, such as patients having similar health behaviors or patients with similar risks who had similar or different diagnostics decisions and treatment results before, and provides an automated mechanism to leverage data from other facilities in the data space for higher accuracy and reliable diagnostic through many similar cases. This embodiment does not require any real data sharing between the facilities, such that one facility will not be able to access to another facility data, whereas they would benefit from each other's knowledge thanks to the semantic data utilization.

In another technical embodiment, the present invention is practically applied for weakly-supervised machine learning for missing data in the semantic graph. This embodiment focuses on the technical problem of creating analytics results/insights especially in the cases of missing data. For instance, certain features can be missing in an entity for creating a machine learning prediction model. In this scenario, the data space platform searches similar entities for having same (or similar) features from different entities to use as the substitute features.

In some embodiments, the missing feature might serve as a ground-truth label, meaning that a machine learning model cannot be directly supervised due to the absence of this feature. In such scenarios, weakly supervised machine learning models such as the data programming approach (see Ratner, Alexander J., Christopher M. De Sa, Sen Wu, Daniel Selsam, and Christopher Ré. "Data programming: Creating large training sets, quickly." Advances in neural information processing systems 29 (2016), which is hereby incorporated by reference herein) can be considered as an alternative to fully-supervised machine learning. Data programming considers labeling functions to serve as weak supervision sources, where a set of labeling functions represent simple heuristics that are programmed through the domain knowledge (e.g., by building operators). Using the data programming approach a weakly-supervised machine learning model can be used to create analytics insights.

In other embodiments, the stakeholder may lack having both features such as the ground-truth labels and even may not have access to labeling functions. In such scenario, the data space platform can leverage the data from similar entities automatically to train a machine learning by using various techniques such as transfer learning or fine tuning (in the presence of a small dataset).

In further embodiments, the stakeholder may lack having both features such as the ground-truth labels and even may not have access to labeling functions. Furthermore, the ground-truth labels may not be provided from any other similar entity in the data space. In such scenario, labeling functions from the similar entities can be automatically leveraged for training a machine learning model using the data from the stakeholder itself and the stakeholders of the similar entities.

In another technical embodiment, the present invention is practically applied for smart manufacturing between connected facilities. This embodiment proposes the application of the data space platform and its features for data exchange and analytics in the factories for manufacturing. In this embodiment, there exist multiple factories representing different stakeholders of the data space platform. Each facility has their data collected from many sensors from manufacturing devices, people (e.g., production records), and robots. The embodiment considers leveraging data from different factories by creating a semantic knowledge graph (i.e., digital twins of factories) and providing analytics results to the given queries by stakeholders.

Each facility shares data from its robots and other data sources. Any data involving personal information can be anonymized and included in the value exchange templates. The training of one robot such as a robot can be utilized by a similar robot in another manufacturing facility (stakeholder). For instance, a robot is trained using its sensors such as cameras and analytics in its internal server such as computer vision-based application. This data can be used as a reinforcement learning source to the robot, where robot learns from its environment through a reward and penalty scheme. The information of the environment may reflect to a similar setup in the other stakeholder. Thus, a similar robot may start with the already available training information and continue its own reinforcement learning.

In this embodiment, the data space platform hosts the data and creates a semantic graph and explores the similarities in the environments and devices (i.e., robots). The data space platform provides an automated data exchange mechanism based on the semantic information and real-time digital twin data from the manufacturing facilities.

In another technical embodiment, the present invention provides is practically applied for traffic management and mobility. This embodiment proposes the application of the data space platform and its features for data exchange and analytics in the transportation domain, where fleets of vehicles are used for transporting people and/or goods. The environment is shared where different vehicles use the same infrastructure. The fleets of vehicles belong to different vehicle manufacturers or Cloud service providers. In this embodiment, each service provider is considered as a stakeholder and they can exchange data with each other for: 1) efficient routing of vehicles, 2) congestion detection, 3) environment information (e.g., potholes on a road), 4) pedestrians and vulnerable road users for safety, 5) mobility-as-a-service (e.g., multi-modal transport), and others.

In another technical embodiment, the present invention provides is practically applied for building energy management. Automated management of energy usage in modern buildings encompasses data collection by sensors, data analytics and prediction, and recommendation and/or direct control of building elements like HVAC and window shades. Direct sharing of data by different building operators is limited by considerations of protecting business data (e.g., energy usage, operating costs) and, potentially, personal data (e.g., occupancy of rooms).

With data sharing, correlations between buildings operated by different stakeholders can be exploited for the sake of better prediction models. The data space platform detects such correlations and automatically builds data exchanges analytics templates from correlated buildings, using the mechanisms described in the invention.

In accordance with another embodiment, the present invention may also be used for automated cost alignment for the data space platform. For example, the data space platform may be used to evaluate startup data cost vs. corporate data cost.

Embodiments of the present invention enable the following advantages and improvements over existing technology:
1. An automated data analytics platform using semantic analytics templates and similarities obtained in the semantic knowledge graph using correlations in the contextualized data sources, enabling higher accuracy predictions.
2. An automated value exchange mechanism by matching the policies listed in the value exchange templates between stakeholders.
3. Reducing energy consumption in buildings by more accurate predictions.
4. More precise diagnostics for patients.

5. Avoiding failures in manufacturing.
6. Avoiding raw data access during collaborative analytics.

In an embodiment, the present invention provides a method for automated sharing of data and analytics across a data space, the method comprising the steps of:

1. The data space platform semantically annotates the data from all stakeholders using the semantic knowledge bases. The data space platform stores a number of "semantic analytics templates". The semantic analysis templates may be used to provide automated data analysis using semantic knowledge graph using correlations in the contextualized data sources, enabling higher accuracy predictions.
2. Determine the currently accessible portion of semantic data for a stakeholder A and utilize semantic data for the requested data analytics service, and provide initial analytics service. In some embodiments of the present invention, this includes prediction of building occupancy, patient health status, or traffic condition prediction. The automated data analysis that is part of the initial analytics service is provided using a semantic knowledge graph using correlations in the contextualized data sources, enabling higher accuracy predictions.
3. For higher quality templates, it is checked whether models could be provided with data accessible to/owned by other stakeholders (e.g., stakeholder B)
4. If higher quality templates could be provided, the data space platform tries to organize the data sharing according to the data usage policies of the stakeholder B. The data is organized using an automated value exchange mechanism by matching the policies listed in the value exchange templates between stakeholders.
5. Once the data space platform has organized the data, the data space platform trains and deploys the higher quality model.
6. Output analytics insights are provided to stakeholder A. In accordance with embodiments of the present invention, this includes prediction of building occupancy, patient health status, or traffic condition prediction.

Figure 7:
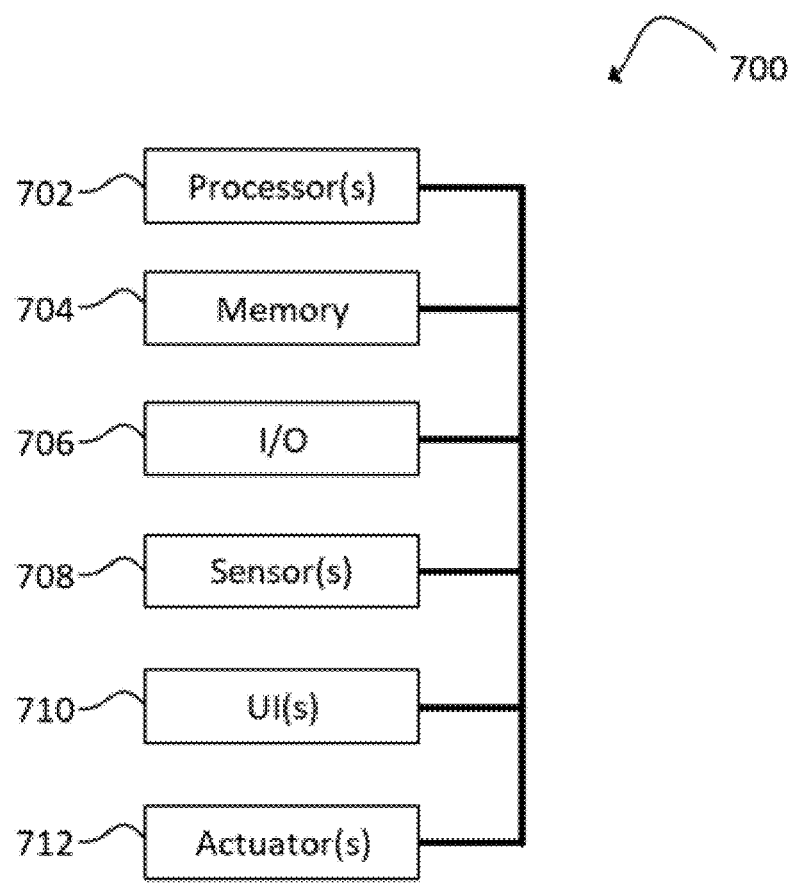
FIG. 7 is a block diagram of an exemplary processing system, which can be configured to perform any and all operations disclosed herein.

Referring to FIG. 7, a processing system 700 can include one or more processors 702, memory 704, one or more input/output devices 706, one or more sensors 708, one or more user interfaces 710, and one or more actuators 712. Processing system 700 can be representative of each computing system disclosed herein.

Processors 702 can include one or more distinct processors, each having one or more cores. Each of the distinct processors can have the same or different structure. Processors 702 can include one or more central processing units (CPUs), one or more graphics processing units (GPUs), circuitry (e.g., application specific integrated circuits (ASICs)), digital signal processors (DSPs), and the like. Processors 702 can be mounted to a common substrate or to multiple different substrates.

Processors 702 are configured to perform a certain function, method, or operation (e.g., are configured to provide for performance of a function, method, or operation) at least when one of the one or more of the distinct processors is capable of performing operations embodying the function, method, or operation. Processors 702 can perform operations embodying the function, method, or operation by, for example, executing code (e.g., interpreting scripts) stored on memory 704 and/or trafficking data through one or more ASICs. Processors 702, and thus processing system 700, can be configured to perform, automatically, any and all functions, methods, and operations disclosed herein. Therefore, processing system 700 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 700 can be configured to perform task "X". Processing system 700 is configured to perform a function, method, or operation at least when processors 702 are configured to do the same.

Memory 704 can include volatile memory, non-volatile memory, and any other medium capable of storing data. Each of the volatile memory, non-volatile memory, and any other type of memory can include multiple different memory devices, located at multiple distinct locations and each having a different structure. Memory 704 can include remotely hosted (e.g., cloud) storage.

Examples of memory 704 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 704.

Input-output devices 706 can include any component for trafficking data such as ports, antennas (i.e., transceivers), printed conductive paths, and the like. Input-output devices 706 can enable wired communication via USBR, Display Port®, HDMIR, Ethernet, and the like. Input-output devices 706 can enable electronic, optical, magnetic, and holographic, communication with suitable memory 706. Input-output devices 706 can enable wireless communication via WiFiR, Bluetooth®, cellular (e.g., LTER, CDMAR, GSMR, WiMax®, NFCR), GPS, and the like. Input-output devices 706 can include wired and/or wireless communication pathways.

Sensors 708 can capture physical measurements of environment and report the same to processors 702. User interface 710 can include displays, physical buttons, speakers, microphones, keyboards, and the like. Actuators 712 can enable processors 702 to control mechanical forces.

Processing system 700 can be distributed. For example, some components of processing system 700 can reside in a remote hosted network service (e.g., a cloud computing environment) while other components of processing system 700 can reside in a local computing system. Processing system 700 can have a modular design where certain modules include a plurality of the features/functions shown in FIG. 7. For example, I/O modules can include volatile memory and one or more processors. As another example, individual processor modules can include read-only-memory and/or local caches.

Embodiments of the present invention can be advantageously applied to regression problems (continuous values) to provide improvements to various technical fields such as operation system design and optimization, material design and optimization, telecommunication network design and optimization, etc. Compared to existing approaches, embodiments of the present invention minimize uncertainty, while increasing performance and accuracy, providing for faster computation and saving computational resources and memory. For example, according to embodiments of the present invention, outliers with low uncertainty can be avoided while the latency and/or memory consumption is linear or constant.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer-implemented method for performing automated sharing of data and analytics across a data space platform, the method comprising:
   receiving a request for a data analytics service from a first data stakeholder of a plurality of data stakeholders;
   determining a first semantic data for the requested data analytics service based on the first data stakeholder and the request, wherein the first semantic data comprises a first set of raw data and semantic annotations, stored as a knowledge graph;
   extracting a second semantic data from a second data stakeholder of the plurality of data stakeholders based on comparing relevance to the first semantic data, wherein the second data stakeholder is different from the first data stakeholder; and
   providing an analytics insight without revealing the second semantic data to the first data stakeholder, wherein the analytics insight is an analyzed result based on the first semantic data and the second semantic data.

2. The method of claim 1, further comprising:
   receiving the first set of raw data at the data space platform from the first data stakeholder; and
   mapping the first set of raw data to a first semantic analytics template of a semantic knowledge base to generate the first semantic data.

3. The method of claim 2, further comprising:
   receiving a second set of raw data at the data space platform from the second data stakeholder;
   mapping the second set of raw data to a second semantic analytics template of the semantic knowledge base to generate the second semantic data; and
   fusing the second semantic data with the first semantic data to generate an updated knowledge graph.

4. The method of claim 3, wherein providing the analytics insight comprises:
   determining that the first semantic data associated with the first data stakeholder in the knowledge graph is not sufficient for training a machine learning model;
   determining that the second semantic data of the knowledge graph is sufficient for training the machine learning model; and
   providing an offer to the first data stakeholder to train the machine learning model using a combination of the first set of raw data, the second set of raw data, and the second semantic data.

5. The method of claim 4, further comprising:
   receiving an acceptance of the first data stakeholder in response to the offer;
   training the machine learning model using the combination of the first set of raw data, the second set of raw data, and the second semantic data; and
   providing the trained machine learning model to the first data stakeholder.

6. The method of claim 4, wherein determining that the first semantic data associated with the first data stakeholder in the knowledge graph is not sufficient for training the machine learning model comprises:
   performing a training of a first machine learning model with the first semantic data associated with the first data stakeholder; and
   determining a first uncertainty associated with the first machine learning model.

7. The method of claim 6, wherein determining that the second semantic data of the knowledge graph is sufficient for training the machine learning model comprises:
   performing a training of a second machine learning model with the second semantic data associated with the second data stakeholder; and
   determining a second uncertainty associated with the second machine learning model.

8. The method of claim 7, wherein determining that the second semantic data of the knowledge graph is sufficient for training the machine learning model is based on whether the first uncertainty is greater than the second uncertainty.

9. The method of claim 1, wherein the request for data analytics includes a prediction request to fill a gap in the first set of raw data.

10. The method of claim 1, wherein providing the analytics insight comprises:
    receiving a set of data policies associated with the second data stakeholder; and
    determining based on the set of data policies associated with the second data stakeholder whether the first data stakeholder has access to data from the second data stakeholder.

11. The method of claim 1, wherein the first data stakeholder and the second data stakeholder are hospitals or medical facilities, and wherein the request for the data analytics service comprises a request for a prediction of patient health of a patient.

12. The method of claim 11, wherein:
    the first data stakeholder is a computing device of a first hospital or medical facility that stores patient health data associated with the patient, the patient health data indicating that the patient has a medical condition,
    the second data stakeholder is a computing device of a second hospital or medical facility that stores health data for other patients having the medical condition, and the prediction of the patient health of the patient comprises:
  determining that the patient health data has missing information;
  identifying relevant data from the health data of the other patients based on determining that the other patients have the medical condition; and
  providing the prediction of the patient health of the patient based on the patient health data and the health data for the other patients, without revealing the health data for the other patients to the computing device of the first hospital.

13. The method of claim 1, wherein the request for the data analytics service comprises a request for a prediction of traffic condition.

14. The method of claim 13, wherein:
the first data stakeholder is a computing device of a first vehicle manufacturer including a first set of traffic data,
the second data stakeholder is a computing device of a second vehicle manufacturer or including a second set of traffic data, and
the prediction of the traffic condition comprises:
  determining that the first set of traffic data has missing information;
  identifying relevant data from the second set of traffic data based on determining that the second set of traffic data is semantically related to the first set of traffic data; and
  providing the prediction of the traffic data based on the first set of traffic data and the second set of traffic data, without revealing the second set of traffic data to the computing device of the first vehicle manufacturer.

15. The method of claim 1, wherein providing the analytics insight further comprises comparing the first semantic data accessible to the first data stakeholder with a third portion of semantic data of the data space platform that is accessible to a third stakeholder.

16. The method of claim 1, wherein the first data stakeholder is a first computing device associated with a first user and the second data stakeholder is a second computing device associated with a second user, wherein the data space platform forms a middleware between the first computing device and the second computing device, and wherein the data space platform restricts the first computing device from accessing data stored by the second computing device.

17. The method of claim 1, wherein the first semantic data and the knowledge graph of the first semantic data are generated from the raw data of the first stakeholder by a semantic mapper of the data space platform, wherein the second semantic data and a knowledge graph of the second semantic data are generated from raw data of the second stakeholder by the semantic mapper, and wherein the data space platform compares relevance of the second semantic data to the first semantic data by comparing a queried entity/attribute and a vicinity from semantic data in the knowledge graph of the second semantic data with a corresponding entity/attribute and a vicinity from semantic data in the knowledge graph of the first semantic data by subgraph matching techniques using text matching or graph matching, or as a greedy comparison by traversing both of the knowledge graphs.

18. The method of claim 1, wherein:
the first data stakeholder is a computing device of a first building that stores first occupancy data associated with the first building,
the second data stakeholder is a computing device of a second building that stores second occupancy data associated with the second building,
the request for the data analytics service comprises a request for a prediction of occupancy data, and
the prediction of occupancy data comprises:
  determining that the first occupancy data has missing information;
  identifying relevant data from the second occupancy data based on determining that the second occupancy data is semantically related to the first occupancy data; and
  providing the prediction of the occupancy data based on the first occupancy data and the second occupancy data, without revealing the second occupancy data to the computing device of the first building.

19. A computer system programmed for performing automated sharing of data and analytics across a data space platform, the computer system comprising one or more hardware processors which, alone or in combination, are configured to:
  receive a request for a data analytics service from a first data stakeholder of a plurality of data stakeholders;
  determine a first semantic data for the data analytics service based on the first data stakeholder of the data space platform and the request, wherein the first semantic data comprises raw data and semantic annotations, which is stored as a knowledge graph;
  extract a second semantic data from a second data stakeholder of the data space platform based on comparing relevance to the first semantic data, wherein the second data stakeholder is different from the first data stakeholder;
  provide an analytics insight without revealing the second semantic data to the first data stakeholder, wherein the analytics insight is an analyzed result based on the first semantic data and the second semantic data.

20. A tangible, non-transitory computer-readable medium for performing automated sharing of data and analytics across a data space platform having instructions thereon, which, upon being executed by one or more processors, provides for execution of the following steps:
  receiving a request for a data analytics service from a first data stakeholder of a plurality of data stakeholders;
  determining a first semantic data for the data analytics service based on the first data stakeholder of the data space platform and the request, wherein the first semantic data comprises raw data and semantic annotations, which is stored as a knowledge graph;
  extracting a second semantic data from a second data stakeholder of the data space platform based on comparing relevance to the first semantic data, wherein the second data stakeholder is different from the first data stakeholder; and
  providing an analytics insight without revealing the second semantic data to the first data stakeholder, wherein the analytics insight is an analyzed result based on the first semantic data and the second semantic data.

* * * * *